(12) United States Patent
Wang

(10) Patent No.: US 11,062,738 B2
(45) Date of Patent: Jul. 13, 2021

(54) SIGNALLING OF VIDEO CONTENT INCLUDING SUB-PICTURE BITSTREAMS FOR VIDEO CODING

(71) Applicant: Qualcomm Incorporated, San Diego, CA (US)

(72) Inventor: Ye-kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 131 days.

(21) Appl. No.: 15/927,993

(22) Filed: Mar. 21, 2018

(65) Prior Publication Data

US 2018/0277164 A1  Sep. 27, 2018

Related U.S. Application Data

(60) Provisional application No. 62/475,832, filed on Mar. 23, 2017.

(51) Int. Cl.
| | | |
|---|---|---|
| *G11B 27/30* | (2006.01) | |
| *H04N 19/46* | (2014.01) | |
| *H04N 21/84* | (2011.01) | |
| *H04N 21/81* | (2011.01) | |
| *H04N 21/8547* | (2011.01) | |

(Continued)

(52) U.S. Cl.
CPC ......... *G11B 27/3027* (2013.01); *H04N 19/33* (2014.11); *H04N 19/46* (2014.11); *H04N 21/2353* (2013.01); *H04N 21/2365* (2013.01); *H04N 21/4347* (2013.01); *H04N 21/4348* (2013.01); *H04N 21/816* (2013.01);
(Continued)

(58) Field of Classification Search
CPC .................................................. G11B 27/3027

USPC ......................................................... 386/331
See application file for complete search history.

(56) References Cited

U.S. PATENT DOCUMENTS 8,320,733 B2 *  11/2012  Eckleder ............... G11B 27/105
                                                       386/232
2006/0047674 A1  3/2006  Visharam et al.
(Continued)

FOREIGN PATENT DOCUMENTS

GB       2512880 A     10/2014

OTHER PUBLICATIONS

Hannuksela M.M., "Technologies under Consideration for ISOBMFF", 116th MPEG Meeting; Oct. 17, 2016-Oct. 21, 2016; Chengdu; (Motion Picture Expert Group or ISO/IEC JTC1/SC29/WG11),, No. N16420, Oct. 25, 2016, XP030023092, 9 pages.

(Continued)

*Primary Examiner* — Eileen M Adams
*Assistant Examiner* — Daniel T Tekle
(74) *Attorney, Agent, or Firm* — Qualcomm Incorporated

(57) ABSTRACT

In various implementations, modifications and/or additions to the ISOBMFF are provided to process video data. A plurality of sub-picture bitstreams are obtained from memory, each sub-picture bitstream including a spatial portion of the video data and each sub-picture bitstream being independently coded. In at least one file, the plurality of sub-picture bitstreams are respectively stored as a plurality of sub-picture tracks. Metadata describing the plurality of sub-picture tracks is stored in a track box within a media file in accordance with a file format. A sub-picture base track is provided that includes the metadata describing the plurality of sub-picture tracks.

35 Claims, 10 Drawing Sheets

(51) Int. Cl.
    *H04N 21/2365*     (2011.01)
    *H04N 21/434*     (2011.01)
    *H04N 21/235*     (2011.01)
    *H04N 19/33*     (2014.01)
    *H04N 21/854*     (2011.01)

(52) U.S. Cl.
    CPC ......... *H04N 21/84* (2013.01); *H04N 21/8547* (2013.01); *H04N 21/85406* (2013.01)

(56) References Cited

U.S. PATENT DOCUMENTS

| | | |
|---|---|---|
| 2006/0165381 A1 | 7/2006 | Eckleder et al. |
| 2010/0153395 A1* | 6/2010 | Hannuksela ..... H04N 21/85406 707/737 |
| 2015/0110118 A1* | 4/2015 | Ouedraogo ........... H04L 65/601 370/394 |
| 2016/0182927 A1* | 6/2016 | Denoual ............ H04N 21/8455 725/109 |
| 2016/0255381 A1* | 9/2016 | Denoual ........ H04N 21/234327 709/231 |

OTHER PUBLICATIONS

International Search Report and Written Opinion—PCT/US2018/023879—ISA/EPO—dated Jun. 19, 2018.

* cited by examiner

SIGNALLING OF VIDEO CONTENT INCLUDING SUB-PICTURE BITSTREAMS FOR VIDEO CODING

CLAIM OF PRIORITY UNDER 35 U.S.C. § 119

The present Application for Patent claims priority to Provisional Application No. 62/475,832 entitled "SIGNALLING OF VIDEO CONTENT INCLUDING SUB-PICTURE BITSTREAMS" filed Mar. 23, 2017, and assigned to the assignee hereof and hereby expressly incorporated by reference herein.

BACKGROUND

Field

This application is related to the signalling of video content related to one or more media file formats, which may be used for video coding, such as an ISO base media file format (ISOBMFF) and/or file formats derived from the ISOBMFF. For example, this application is related to signalling of video content related to one or more media file formats for use with virtual reality (VR). As a further example, this application is related to methods, devices, and systems for signalling of video content related to one or more media file formats including sub-picture bitstreams for use with video coding.

Background

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its scalable video coding extension known as Scalable Video Coding (SVC) and its multiview video coding extension Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

SUMMARY

Techniques are described for signalling of video including of a plurality of sub-picture bitstreams stored in a plurality of sub-picture tracks. More particularly, techniques are described for signalling approaches that enable the signalling of the relationship among the sub-picture tracks, the spatial resolution of the full picture, and timed metadata for the entire video content.

In some examples, techniques are described for encoding and decoding of separate and independent sub-picture bitstreams. Independent sub-picture bitstreams find applicability, for example, to conventional two-dimensional (2D) as well as Virtual Reality (VR) environments. VR provides a user with the perception that the user is present in a non-physical world created by the rendering of natural and/or synthetic image and sound correlated by the movements of the enabling the user to interact with that world.

In some examples, the methods, apparatuses, and computer readable medium described above further comprise obtaining, from memory, a plurality of sub-picture bitstreams, each sub-picture bitstream including a spatial portion of the video data and each sub-picture bitstream being independently coded. In some examples, respectively storing, in at least one file, the plurality of sub-picture bitstreams as a plurality of sub-picture tracks, and storing, in a track box within a media file in accordance with a file format, metadata describing parameters associated with the plurality of sub-picture tracks.

In some examples, the methods, apparatuses, and computer readable medium described above further include storing a sub-picture base track associated with the plurality of sub-picture tracks.

In some examples, the parameters include one or more of an indication of whether the virtual reality data includes 2-dimensional video data or 3-dimensional video data, an indication of whether the video data is pre-stitched video data or post-stitched video data, or a mapping type for the video data. In some examples, the parameters are stored in the file in a scheme information box.

In some examples the file format is based on an International Standards Organization (ISO) base media file format.

According to an example a method of processing video data includes obtaining, from memory, a plurality of sub-picture bitstreams, each sub-picture bitstream including a spatial portion of the video data and each sub-picture bitstream being independently coded; respectively storing, in at least one file, the plurality of sub-picture bitstreams as a plurality of sub-picture tracks; and storing, in a track box within a media file in accordance with a file format, metadata describing the plurality of sub-picture tracks. The media file optionally includes at least one file. Likewise, the method may optionally include storing a sub-picture base track associated with the plurality of sub-picture tracks and indicating the sub-picture base track based on a sample entry type within a sample description box of the track box. According to an example, the sub-picture base track optionally includes the metadata describing the plurality of sub-picture tracks. Likewise, the metadata may optionally include a spatial resolution of a full picture associated with a set of the plurality of sub-picture tracks. The file format may optionally be based on an International Standards Organization (ISO) base media file format and/or a backward compatible extension to the TrackGroupTypeBox set forth in clause 8.3.4 of the ISO base media file format identified by ISO/IEC 14496-12, Part 12.

According to another example a method of processing video data includes obtaining, from memory, a plurality of sub-picture bitstreams, each sub-picture bitstream including a spatial portion of the video data and each sub-picture bitstream being independently coded; respectively storing, in at least one file, the plurality of sub-picture bitstreams as a plurality of sub-picture tracks; and storing, in a track box within a media file in accordance with a file format, metadata describing the plurality of sub-picture tracks. The method may optionally include storing, within the track box, a track group type to a value that indicates that a track associated with the track box is one of a group of sub-picture tracks, the group of sub-picture tracks representative of a single representation of the video data. The method may also optionally include storing, within the track box, a track group type box designating a track grouping type. The file format may optionally be based on an International Standards Organization (ISO) base media file format and/or a backward compatible extension to the TrackGroupTypeBox set forth in clause 8.3.4 of the ISO base media file format identified by ISO/IEC 14496-12, Part 12.

According to another example a method of processing video data includes obtaining, from memory, a plurality of sub-picture bitstreams, each sub-picture bitstream including a spatial portion of the video data and each sub-picture bitstream being independently coded; respectively storing, in at least one file, the plurality of sub-picture bitstreams as a plurality of sub-picture tracks; and storing, in a track box within a media file in accordance with a file format, metadata describing the plurality of sub-picture tracks. The method may optionally include storing, within the track box, a track group type box designating a track grouping type. Likewise, the track grouping type may optionally indicate that additional information is available to be added to the track box. Further, when the track grouping type indicates that additional information is available to be added to the track box, the method may optionally include storing, within the track box, sub-picture row index information and sub-picture column index information of sub-pictures in the track.

According to another example a method of processing video data includes obtaining, from memory, a plurality of sub-picture bitstreams, each sub-picture bitstream including a spatial portion of the video data and each sub-picture bitstream being independently coded; respectively storing, in at least one file, the plurality of sub-picture bitstreams as a plurality of sub-picture tracks; and storing, in a track box within a media file in accordance with a file format, metadata describing the plurality of sub-picture tracks. Sub-pictures may be optionally encoded within the sub-picture bitstream are defined in sub-picture rows and sub-picture columns. The sub-pictures may be optionally encoded within the sub-picture bitstream are groupable as tiles such that the tiles are defined tile rows and tile columns.

According to another example a method of processing video data includes obtaining, from memory, a plurality of sub-picture bitstreams, each sub-picture bitstream including a spatial portion of the video data and each sub-picture bitstream being independently coded; respectively storing, in at least one file, the plurality of sub-picture bitstreams as a plurality of sub-picture tracks; and storing, in a track box within a media file in accordance with a file format, metadata describing the plurality of sub-picture tracks. When the track grouping type indicates that additional information is available to be added to the track box, the method may optionally store, within the track box, coordinates corresponding to an upper-left corner pixel of sub-picture in the track. When the track grouping type indicates that additional information is available to be added to the track box, the method may optionally store, within the track box, information representing a size of a full picture.

According to an example, a device is provided for decoding video data, the device including memory configured to store at least one file and a media file, the media file being formatted in accordance with a file format and the at least one file including a plurality of sub-picture tracks; and a processor, in communication with the memory, the processing being configured to: process the media file; and obtain, from a track box within the media file, metadata describing the plurality of sub-picture tracks included within the at least one file. According to a related example, the device may be operable to perform analogous operations in the exemplary method operations set forth above. The device may optionally be a wireless communication device, and further include a transmitter configured to transmit the plurality of sub-picture bitstreams. The device may optionally be a cellular telephone and the plurality of sub-picture bitstreams may be optionally modulated for transmission according to a cellular communication standard.

According to another example, a device is provided for processing video data, the device including memory configured to store a plurality of sub-picture bitstreams, each sub-picture bitstream including a spatial portion of the video data and each sub-picture bitstream being independently coded; and a processor in communication with the memory the processor being configured to: obtain, from the memory, the plurality of sub-picture bitstreams; respectively store, in at least one file, the plurality of sub-picture bitstreams as a plurality of sub-picture tracks; and store, in a track box within a media file in accordance with a file format, metadata describing the plurality of sub-picture tracks. According to a related example, the device may be operable to perform analogous operations in the exemplary method operations set forth above.

According to a related example, a device is provided including means for obtaining, from memory, a plurality of sub-picture bitstreams, each sub-picture bitstream including a spatial portion of the video data and each sub-picture bitstream being independently coded; means for respectively storing, in at least one file, the plurality of sub-picture bitstreams as a plurality of sub-picture tracks; and means for storing, in a track box within a media file in accordance with a file format, metadata describing the plurality of sub-picture tracks. The device may provide that the media file includes the at least one file. The device may optionally provide means for storing a sub-picture base track associated with the plurality of sub-picture tracks or means for indicating the sub-picture base track based on a sample entry type within a sample description box of the track box. The device may optionally provide that the sub-picture base track includes the metadata describing the plurality of sub-picture tracks or the device may optionally provide that the metadata includes a spatial resolution of a full picture associated with a set of the plurality of sub-picture tracks. Likewise, the device may provide the file format based on an International Standards Organization (ISO) base media file format. Further, the device may optionally provide means for storing, within the track box, a track group type to a value that indicates that a track associated with the track box is one of a group of sub-picture tracks, the group of sub-picture tracks representative of a single representation of the video data. The track group type is optionally backward compatible extension to the TrackGroupTypeBox set forth in clause 8.3.4 of the ISO base media file format identified by ISO/IEC 14496-12, Part 12.

According to a related example, the device may optionally provide means for storing, within the track box, a track group type box designating a track grouping type. The track grouping type may optionally indicate that additional information is available to be added to the track box. Further, the track grouping type may optionally indicate that additional information is available to be added to the track box, storing, within the track box, sub-picture row index information and sub-picture column index information of sub-pictures in the track or that sub-pictures encoded within the sub-picture bitstream are defined in sub-picture rows and sub-picture columns. Sub-pictures encoded within the sub-picture bitstream are optionally groupable as tiles such that the tiles are defined tile rows and tile columns. The track grouping type may optionally indicate that additional information is available to be added to the track box, storing, within the track box, coordinates corresponding to an upper-left corner pixel of sub-picture in the track. Further, when the track grouping type indicates that additional information is available to be added to the track box, the device may provide means for storing, within the track box, information representing a size of a full picture.

According to another related example, a non-transitory computer-readable medium is provided having instructions stored thereon that, when executed, cause one or more processors of an electronic device to: obtain, from memory, a plurality of sub-picture bitstreams, each sub-picture bitstream including a spatial portion of the video data and each sub-picture bitstream being independently coded; respectively store, in at least one file, the plurality of sub-picture bitstreams as a plurality of sub-picture tracks; and store, in a track box within a media file in accordance with a file format, metadata describing the plurality of sub-picture tracks. The one or more processors may provide that the media file includes the at least one file. The one or more processors may optionally provide instructions for storing a sub-picture base track associated with the plurality of sub-picture tracks or for indicating the sub-picture base track based on a sample entry type within a sample description box of the track box. The one or more processors may optionally provide instructions that the sub-picture base track includes the metadata describing the plurality of sub-picture tracks or the one or more processors may optionally provide that the metadata includes a spatial resolution of a full picture associated with a set of the plurality of sub-picture tracks. Likewise, the one or more processors may provide the file format based on an International Standards Organization (ISO) base media file format. Further, the one or more processors may optionally provide instructions for storing, within the track box, a track group type to a value that indicates that a track associated with the track box is one of a group of sub-picture tracks, the group of sub-picture tracks representative of a single representation of the video data. The track group type is optionally backward compatible extension to the TrackGroupTypeBox set forth in clause 8.3.4 of the ISO base media file format identified by ISO/IEC 14496-12, Part 12.

According to a related example, the one or more processors may optionally provide instructions for storing, within the track box, a track group type box designating a track grouping type. The track grouping type may optionally indicate that additional information is available to be added to the track box. Further, the track grouping type may optionally indicate that additional information is available to be added to the track box, storing, within the track box, sub-picture row index information and sub-picture column index information of sub-pictures in the track or that sub-pictures encoded within the sub-picture bitstream are defined in sub-picture rows and sub-picture columns. Sub-pictures encoded within the sub-picture bitstream are optionally groupable as tiles such that the tiles are defined tile rows and tile columns. The track grouping type may optionally indicate that additional information is available to be added to the track box, storing, within the track box, coordinates corresponding to an upper-left corner pixel of sub-picture in the track. Further, when the track grouping type indicates that additional information is available to be added to the track box, the one or more processors may provide instructions for storing, within the track box, information representing a size of a full picture.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

DETAILED DESCRIPTION

Figure 1:
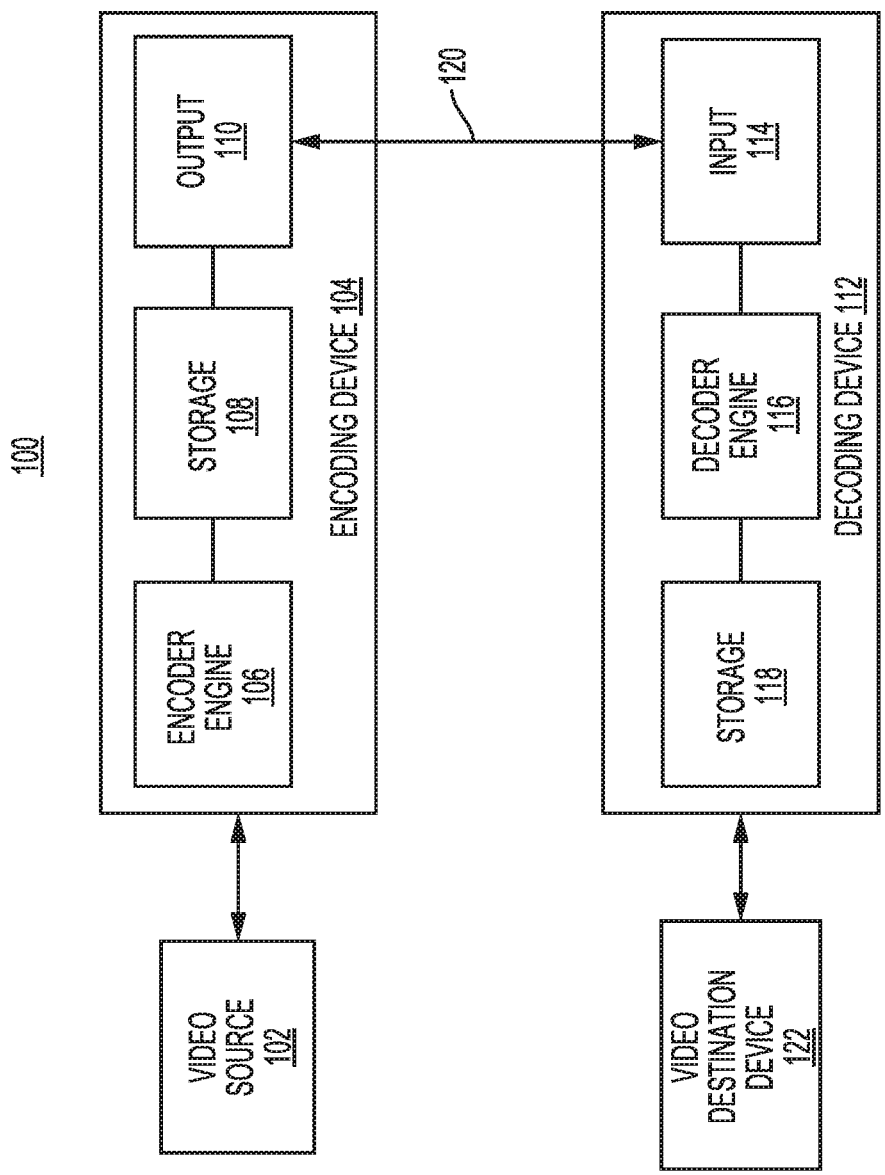
FIG. 1 is a block diagram illustrating an example of a system 100 including an encoding device 104 and a decoding device 112.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of the examples of the disclosure. However, it will be apparent that various examples may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an exemplary embodiment. It should be understood that various changes may be made in the function and arrangement of elements without departing from the spirit and scope of the disclosure as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) describes a three-dimensional, computer-generated environment that can be interacted within a seemingly real or physical way. Generally, a user experiencing a virtual reality environment uses electronic equipment, such as a head-mounted display (HMD) and optionally also clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

A virtual reality system typically includes a video capture device and a video display device, and possibly also other intermediate devices such as servers, data storage, and data transmission equipment. A video capture device may include a camera set, that is, a set of multiple cameras, each oriented in a different direction and capturing a different view. As few as six cameras can be used to capture a full 360-degree view centered on the camera set's location. Some video capture devices may use fewer cameras, such as, for example, video capture devices that capture primarily side-to-side views. A video generally includes frames, where a frame is an electronically coded still image of a scene. Cameras capture a certain number of frames per second, which is usually referred to as the camera's frame rate.

To provide a seamless 360-degree view, the video captured by each of the cameras in the camera set typically undergoes image stitching. Image stitching in the case of 360-degree video generation involves combining or merging video frames from adjacent cameras in the area where the video frames overlap or would otherwise connect. The result would be an approximately spherical frame, but similar to a Mercator projection, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes are typically used to represent a spherical environment.

Virtual reality video frames, mapped to a planar representation, can be encoded and/or compressed for storage and/or transmission. Encoding and/or compression can be accomplished using a video codec (e.g., a H.265/HEVC compliant codec, a H.264/AVC compliant codec, or other suitable codec) and results in a compressed video bitstream or group of bitstreams. Encoding of video data using a video codec is described in further detail below.

The encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a virtual reality system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. The receiver device can support the media or file format that was used to pack the video bitstream into a file (or files), extract the video (and possibly also audio) data, to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

File format standards can define the format for packing and unpacking video (and possibly also audio) data into one or more files. File format standards include International Organization for Standardization (ISO) base media file format (ISOBMFF, defined in ISO/IEC 14496-12) and other file formats derived from the ISOBMFF, including Motion Pictures Experts Group (MPEG) MPEG-4 file format (defined in ISO/IEC 14496-15), 3rd Generation Partnership Project (3GPP) file format (defined in 3GPP TS 26.244) and Advanced Video Coding (AVC) file format and High Efficiency Video Coding (HEVC) file format (both defined in ISO/IEC 14496-15).

The ISOBMFF is used as the basis for many codec encapsulation formats (e.g., the AVC file format or any other suitable codec encapsulation format), as well as for many multimedia container formats (e.g., the MPEG-4 file format, the 3GPP file format (3GP), the DVB file format, or any other suitable multimedia container format). ISOBMFF-base file formats can be used for continuous media, which is also referred to as streaming media.

In addition to continuous media (e.g., audio and video), static media (e.g., images) and metadata can be stored in a file conforming to ISOBMFF. Files structured according to the ISOBMFF may be used for many purposes, including local media file playback, progressive downloading of a remote file, as segments for Dynamic Adaptive Streaming over HTTP (DASH), as containers for content to be streamed (in which case the containers include packetization instructions), for recording of received real-time media streams, or other uses.

A box is an elementary syntax structure in the ISOBMFF, including a four-character coded box type, the byte count of the box, and the payload. An ISOBMFF file includes of a sequence of boxes, and boxes may contain other boxes. A Movie box ("moov") contains the metadata for the continuous media streams present in the file, each one represented in the file as a track. The metadata for a track is enclosed in a Track box ("trak"), while the media content of a track is either enclosed in a Media Data box ("mdat") or directly in a separate file. The media content for tracks consists of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g. for progressive download or DASH. For streaming purposes, the movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

In general, virtual reality (VR) is the ability to be virtually present in a non-physical world created by the rendering of natural and/or synthetic image and sound correlated by the movements of the immersed user allowing the immersed user to interact with that world. With the recent progress made in rendering devices, such as, but not limited to, head mounted displays (HMD), and VR video (often also referred to as 360 degree video) creation, a significant quality of experience can be offered. VR applications including gaming, training, education, sports video, online shopping, adult entertainment, and so on.

A typical VR system including the following:
1) A camera set, which typically includes multiple individual cameras pointing to different directions and ideally collectively covering all viewpoints around the camera set.
2) Image stitching, wherein video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format may be encoded/compressed using a video codec, e.g., H.265/HEVC, H.264/AVC, compression techniques currently under development and/or forthcoming video compression techniques/video compression standards.
4) The compressed video bitstream(s) may be stored and/or encapsulated in a media format and transmitted (possibly only the subset covering only the area being perceived by a user) through a wired or wireless network to a receiver.
5) The receiver receives the video bitstream(s) or part thereof, possibly encapsulated in a format, and sends the decoded video signal or part thereof to a rendering device.
6) The rendering device can be e.g., an HMD, which can track head movement/positioning and even eye move moment and rendering the corresponding part of the video such that an immersive experience is delivered to the user.

The Omnidirectional Media Application Format (OMAF) is being developed by MPEG to define a media application format that enables omnidirectional media applications, focusing on VR applications with 360° video and associated audio. OMAF specifies a list of projection methods that can be used for conversion of a spherical or 360° video into a two-dimensional rectangular video. OMAF further specifies storage of omnidirectional media and the associated metadata using the ISO base media file format (ISOBMFF) and how to encapsulate, signal, and stream omnidirectional media using dynamic adaptive streaming over HTTP (DASH). OMAF further specifies video and audio codecs as well as media coding configurations that can be used for compression and playback of the omnidirectional media signal. OMAF is standardized as ISO/IEC 23000-20, and its latest draft specification, referred to as the OMAF Committee Draft (CD), is available from MPEG (Working Group 11 of SC29).

Viewport dependent video coding may be provided in virtual reality applications. The OMAF Committee Draft (CD), at clause A.3, includes descriptions of several approaches for omnidirectional video streaming based on viewport dependent video coding. Some of the approaches are based HEVC tiles, while one of the approaches is based encoding and decoding of sub-picture bitstreams. By way of example, signalling of viewport dependent video coding may particularly relate to approaches based encoding and decoding of sub-picture bitstreams.

Sub-picture bitstream coding scheme is an approach wherein sub-picture sequences of the source video content are formed during preprocessing (e.g., prior to encoding such that each sub-picture bitstream may be encoded separately from one another. For example, the source video content is separated (e.g., split) into the sub-picture sequences prior to encoding. The resulting (i.e., post separation) sub-picture sequences are subsequently encoded into respective sub-picture bitstreams. Separate and independent encoding may be provided by various video codecs, such as, for example, AVC or HEVC. One of ordinary skill would recognize that other video encoding techniques may be utilized, such as VP9, and other techniques that are under development, such as, for example, VP10 and AV1. It will also be evident to one of ordinary skill in the art that newly presented aspects and examples of this disclosure related to creation, modification, and/or designation a sub-picture base track.

As mentioned above, the sub-picture bitstream coding scheme (or approach) permits sub-picture bitstreams associated with source video content that may be separately and independently encoded from one another. According to aspects of the present disclosure, a sub-picture base track provides benefits when utilizing sub-picture bitstream approach.

In the sub-picture bitstream approach, video content is encoded and stored in a file based on the ISOBMFF as follows. The source video is split into sub-picture sequences before (prior to) the source video content being encoding. Each sub-picture sequence covers (i.e., includes or comprises) a subset of the spatial area of the full source video content. Each sub-picture sequence is then encoded independently from each other as a single bitstream. Such a bitstream is referred to as a sub-picture bitstream. Several distinct bitstreams may be encoded from the same sub-picture sequence, e.g. a single sub-picture sequence may be encoded at different bitrates thereby yielding a plurality of distinct sub-picture bitstreams. Each sub-picture bitstream is encapsulated in a file as its own respective track. Such a track is referred to as a sub-picture track.

The present improvements and optimizations to the sub-picture based approach recognized a need for optimizations of decoding complexity and transmission bandwidth in VR applications.

In the sub-picture bitstream approach, each sub-picture bitstream is encapsulated in a file as its own track and made available for streaming. At the receiver side, the tracks to be streamed are selected based on the orientation/viewport metadata. The client (e.g., a destination device) usually receives tracks covering the entire omnidirectional content. Better quality or higher resolution tracks are received for the current viewport compared to the quality or resolution covering the remaining, currently non-visible areas. Each track is decoded with a separate decoder instance. It is possible that sub-pictures overlap, e.g., to provide guard band functionality.

Existing designs for storage and signalling of a video content including of multiple sub-picture bitstreams stored in multiple sub-picture tracks have a number of issues. A first issue is that there is no indication provided in the current sub-picture bitstream approach of the relationship among the sub-picture tracks. This would make it uneasy for a file parser to figure out (i.e., determine) which set of the sub-picture tracks carries one complete representation of the full video content.

Another issue is that there is no indication of the spatial resolution of the full picture (i.e., the full video content). In other words, all the sub-picture tracks need to be fetched and parsed to figure out the size of the full picture, which is cumbersome as in many cases only a subset of these tracks is needed.

Another issue relates to ISOBMFF track reference of type 'cdsc'. A timed metadata track may be used to signal timed information of a media track and is associated with the media track through the track reference of type 'cdsc'. This media track is also referred to as the referenced (media) track of the timed metadata track. However, a media content can be represented in multiple media tracks, e.g., a video content carried in a tile base track and a number of tile tracks, or a video content carried in a number of sub-picture tracks. In the former case (of a tile base track and a number of tile tracks), it is straightforward to choose the tile base track as the referenced media track for the timed metadata track, and the semantics of the track reference type 'cdsc' is interpreted as "this track describes the video content represented by the referenced tile base track and all the associated tile tracks." However, in the latter case (of a number of sub-picture tracks in accordance with sub-picture bitstream approach), choosing any of the sub-picture tracks as the referenced track is not desirable because this is interpreted as "the timed metadata track contains information only on the sub-picture part of the video content." In other words, the time metadata track would contain information with respect to only a single sub-picture track and therefore would not provide information on a set of sub-picture tracks that constitute the full video content.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, mobile station, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet or cellular communication environment), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

FIG. 1 illustrates an example video encoding and decoding system 100 that may utilize a video coding technique and file format technique as described in this disclosure. As shown in FIG. 1, system 100 video source 102 and encoding device 104 may be utilized to generate encoded video data to be decoded at a later time by a destination module including video destination device 122 and decoding device 112. In the example of FIG. 1, the video source 102, which may be included along with encoding device 104 in a wireless device (not shown), and the video destination device, which may be included along with decoding device 112 in a wireless device (not shown), are on separate devices. Specifically, the video source module 102 is part of the source module, and the video destination module 122 is part of a destination device. It is noted, however, that the source and destination modules 102, 122 may be on or part of the same device. By way of example, a wireless device (not shown), may include video source 102, encoding device 104, and a transmitter (not shown). The wireless communication device may optionally be a cellular telephone and an encoded video bitstream may be transmitted by the transmitter and modulated according to a cellular communication standard. Likewise, a wireless device (not shown), may include video destination device 122, decoding device 112, and a receiver (not shown). The wireless communication device may optionally be a cellular telephone and an encoded video bitstream may be received by the receiver and modulated according to a cellular communication standard.

With reference once again, to FIG. 1, the video source 102 and the video destination device 122 may comprise or be included in any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, automobiles/vehicles, wearable gear, etc. In some cases, the video source 102 and the video destination device 122 may be equipped for wireless communication.

The video destination device 122 may receive the encoded video data to be decoded via a link 120. The link 120 may comprise any type of medium or device capable of moving the encoded video data from the video source 102 to the video destination device 122. As an example, the link 120 may comprise a communication medium to enable the video source 102 to transmit encoded video data directly to the video destination device 122 in real-time. The encoded video data may be modulated according to a communication standard, such as a wireless communication protocol, and transmitted to the video destination device 122. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the video source 102 to the video destination device 122.

The encoding device 104 (or encoder) can be used to encode video data, including virtual reality video data, using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable video coding and multiview vide coding extensions, known as SVC and MVC, respectively. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Implementations described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 102 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signalled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signalled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by Intra prediction, and, therefore, is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with Intra prediction or inter-prediction. When the inter-prediction applies, the block is only predicted by one reference picture, and, therefore, reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some examples, the video destination device 122 may be part of the receiving device that includes the decoding device 112. In some examples, the video destination device 122 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content). SEI messages may be encapsulated into a video bitstream in a non-VCL NAL.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. A slice is a spatially distinct region of a video frame that is encoded separately from any other region in the same frame. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

VCL NAL units include coded picture data forming the coded video bitstream. Various types of VCL NAL units are defined in the HEVC standard. In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (IRAP) pictures (also referred to as "random access pictures"). In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an IRAP picture at the base layer (the layer ID equal to 0), the AU is an IRAP AU.

A video bitstream encoded as discussed above can be written or packed into one or more files in order to transfer the bitstream from the encoding device 104 to the decoding device 112. For example, the output 110 may include a file writing engine, configured to generate one or more files that contain the bitstream. The output 110 can transmit the one or more files over the communications link 120 to the decoder device 112. Alternatively or additionally, the one or more files can be stored on a storage medium (e.g., a tape, a magnetic disk, or a hard drive, or some other medium) for later transmission to the decoding device 112.

The decoder device 112 can include, for example in the input 114, a file parsing engine. The file parsing engine can read files received over the communications link 120 or from a storage medium. The file parsing engine can further extract samples from the file, and reconstruct the bitstream for decoding by the decoder engine 116. In some cases, the reconstructed bitstream can be the same as the bitstream generated by the encoder engine 106. In some cases, the encoder engine 106 may have generated the bitstream with several possible options for decoding the bitstream, in which case the reconstructed bitstream may include only one or fewer than all the possible options.

A video bitstream encoded as discussed above can be written or packed into one or more files using the ISOBMFF, a file format derived from the ISOBMFF, some other file format, and/or a combination of file formats including the ISOBMFF. The file or files can be played back using a video player device, can be transmitted and then displayed, and/or be stored.

Figure 2:
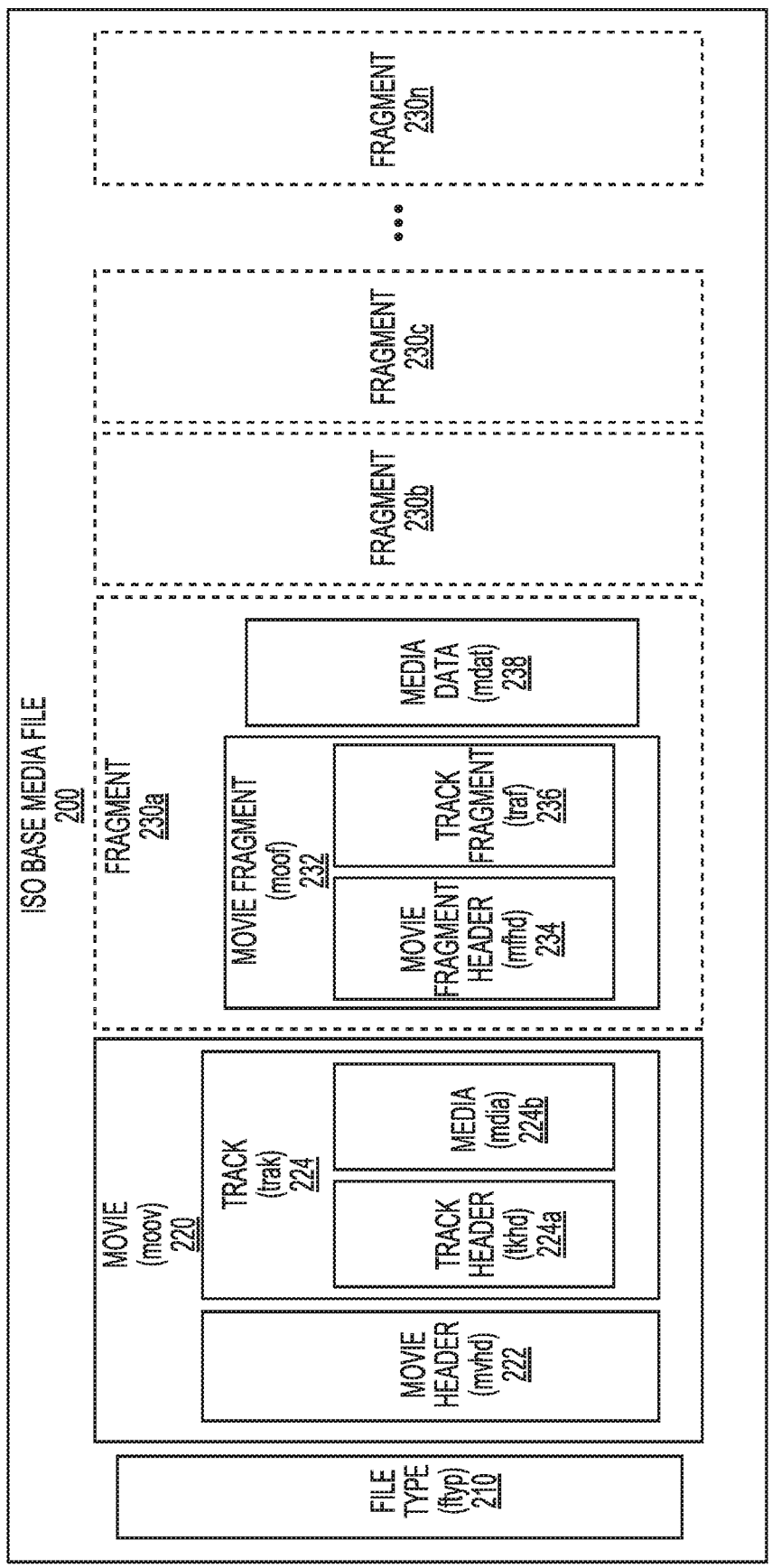
FIG. 2 illustrates an example of an ISO base media file 200 that contains data and metadata for a video presentation, formatted according to the ISOBMFF.

FIG. 2 illustrates an example of an ISO base media file 200 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

FIG. 2 illustrates that, at the top level of the file, an ISO base media file 200 can include a file type box 210, a movie box 220, and one or more movie fragment boxes 230a . . . 230n. Other boxes that can be included at this level but that are not represented in this example include free space boxes, metadata boxes, and media data boxes, among others.

An ISO base media file can include a file type box 210, identified by the box type "ftyp." The file type box 210 identifies an ISOBMFF specification that is the most suitable for parsing the file. "Most" in this instance means that the ISO base media file 200 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 210 can also include a version number, which can be used to indicate a version of the ISOBMFF specification. The file type box 210 can also include a list of compatible brands, which includes a list of other brands with which the file is compatible. An ISO base media file can be compatible with more than one major brand.

When an ISO base media file 200 includes a file type box 210, there is only one file type box. An ISO base media file 200 may omit the file type box 210 in order to be compatible with older player devices. When an ISO base media file 200 does not include a file type box 210, a player device can assume a default major brand (e.g. "mp41"), minor version (e.g., "0"), and compatible brand (e.g., "mp41"). The file type box 210 is typically placed as early as possible in the ISO base media file 200.

An ISO base media file can further include a movie box 220, which contains the metadata for the presentation. The movie box 220 is identified by the box type "moov." ISO/IEC 14496-12 provides that a presentation, whether contained in one file or multiple files, can include only one movie box 220. Frequently, the movie box 220 is near the beginning of an ISO base media file. The movie box 220 includes a movie header box 222, and can include one or more track boxes 224 as well as other boxes.

The movie header box 222, identified by the box type "mvhd," can include information that is media-independent and relevant to the presentation as a whole. For example, the movie header box 222 can include information such as a creation time, a modification time, a timescale, and/or a duration for the presentation, among other things. The movie header box 222 can also include an identifier that identifies the next track in the presentation. For example, the identifier can point to the track box 224 contained by the movie box 220 in the illustrated example.

The track box 224, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 224 includes a track header box 224a and a media box 224b. A track box can include other boxes, such as a track reference box, a track group box, an edit box, a user data box, a meta box, and others.

The track header box 224a, identified by the box type "tkhd," can specify the characteristics of a track contained in the track box 224. For example, the track header box 224a can include a creation time, modification time, duration, track identifier, layer identifier, group identifier, volume, width, and/or height of the track, among other things. For a media track, the track header box 224a can further identify whether the track is enabled, whether the track should be played as part of the presentation, or whether the track can be used to preview the presentation, among other things. Presentation of a track is generally assumed to be at the beginning of a presentation. The track box 224 can include an edit list box, not illustrated here, that can include an explicit timeline map. The timeline map can specify, among other things, an offset time for the track, where the offset indicates a start time, after the beginning of the presentation, for the track.

In the illustrated example, the track box 224 also includes a media box 224b, identified by the box type "mdia." The media box 224b can contain the objects and information about the media data in the track. For example, the media box 224b can contain a handler reference box, which can identify the media type of the track and the process by which the media in the track is presented. As another example, the media box 224b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, the media box 224b can also include a media header box.

In the illustrated example, the example ISO base media file 200 also includes multiple fragments 230a, 230b, 230c, 230n of the presentation. The fragments 230a, 230b, 203c, 230n are not ISOBMFF boxes, but rather describe a movie fragment box 232 and the media data box 238 that is referenced by the movie fragment box 232. The movie fragment box 232 and media data boxes 238 are top-level boxes, but are grouped here to indicate the relationship between a movie fragment box 232 and a media data box 238.

A movie fragment box 232, identified by the box type "moof," can extend a presentation by including additional information that would otherwise be stored in the movie box 220. Using movie fragment boxes 232, a presentation can be built incrementally. A movie fragment box 232 can include a movie fragment header box 234 and a track fragment box 236, as well as other boxes not illustrated here.

The movie fragment header box 234, identified by the box type "mfhd," can include a sequence number. A player device can use the sequence number to verify that the fragment 230a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 232 can also include one or more track fragment boxes 236, identified by the box type "traf." A movie fragment box 232 can include a set of track fragments, zero or more per track. The track fragments can contain zero or more track runs, each of which describes a contiguous run of samples for a track. Track fragments can be used to add empty time to a track, in addition to adding samples to the track.

The media data box 238, identified by the box type "mdat," contains media data. In video tracks, the media data box 238 would contain video frames. A media data box can alternatively or additionally include audio data. A presentation can include zero or more media data boxes, contained in one or more individual files. The media data is described by metadata. In the illustrated example, the media data in the media data box 238 can be described by metadata included in the track fragment box 236. In other examples, the media data in a media data box can be described by metadata in the movie box 220. The metadata can refer to a particular media data by an absolute offset within the file 200, such that a media data header and/or free space within the media data box 238 can be skipped.

Other fragments 230b, 230c, 230n in the ISO base media file 200 can contain boxes similar to those illustrated for the first fragment 230a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

The ISOBMFF, while flexible and extensible and widely used to store and transmit various types of media, does not include mechanisms for indication of a relationship among the separately coded and independent sub-picture tracks. The absence of such mechanisms would make it uneasy for a file parser to figure out which set of the video tracks carries one representation of the full video content.

The ISOBMFF also does not provide an indication of the spatial resolution of the full picture when utilizing separately coded and independent sub-picture tracks. The absence of such indication means that all the sub-picture tracks need to be fetched and parsed to figure out the size of the full picture, which is cumbersome as in many cases only a subset of these tracks is needed.

The ISOBMFF, when utilizing separately coded and independent sub-picture tracks, has an issue related to track reference of type 'cdsc'. A timed metadata track may be used to signal timed information of a media track and is associated with the media track through the track reference of type 'cdsc'. This media track is also referred to as the referenced (media) track of the timed metadata track. However, a media content can be represented in multiple media tracks, e.g., a video content carried in a tile base track and a number of tile tracks, or a video content carried in a number of sub-picture tracks. In the former case (of a tile base track and a number of tile tracks), it is straightforward to choose the tile base track as the referenced media track for the timed metadata track, and the semantics of the track reference type 'cdsc' is interpreted as "this track describes the video content represented by the referenced tile base track and all the associated tile tracks." However, in the latter case (of a number of sub-picture tracks), choosing any of sub-picture tracks as the referenced track is not desirable because this is interpreted as "the timed metadata track contains information only on the sub-picture part of the video content."

In various implementations, the ISOBMFF and/or file formats derived from the ISOBMFF can be modified and/or extended to address the issues set forth above by way of the examples and examples sets forth below. The examples and embodiments set forth below may have particular applicability related to control and processing for virtual reality content.

The sub-picture base track is a video media track that uses the handler type 'vide', and can be used to document (i.e., provide/include) some "global" information (i.e., information applicable to, associated with, or describing the plurality of sub-picture tracks) of the video content that is common to all the sub-picture tracks of the video content. The sub-picture base track does not contain coded video data units. For example, in the context of NAL unit based video such as AVC and HEVC, the sub-picture base track does not contain any VCL NAL units. A special sample entry type, e.g. 'spbt', within the sample description box ("stsd") of the ISOBMFF is used for (e.g., to indicate) a sub-picture base track.

One example of such global information may be the spatial resolution of the full picture of the video content as well as the respective position and respective size of each of the sub-pictures relative to the full picture, where each sub-picture is identified by the track identifier (ID) containing the sub-picture bitstream that the given sub-picture corresponds to. These parameters may be contained in the sample entry of the sub-picture base track. This example, in particular, may be applied to VR applications as well as non-VR applications.

Another example of such global information may be the global omnidirectional media specific information such as projection, region-wise packing, orientation, and/or coverage similarly as specified in the OMAF CD. The global omnidirectional media specific information may also be signalled in the sample entry of the sub-picture base track, and may or may not be signalled within the sub-picture tracks, which preferably also use the restricted scheme sample entry type, same as the sub-picture base track.

Figure 3:
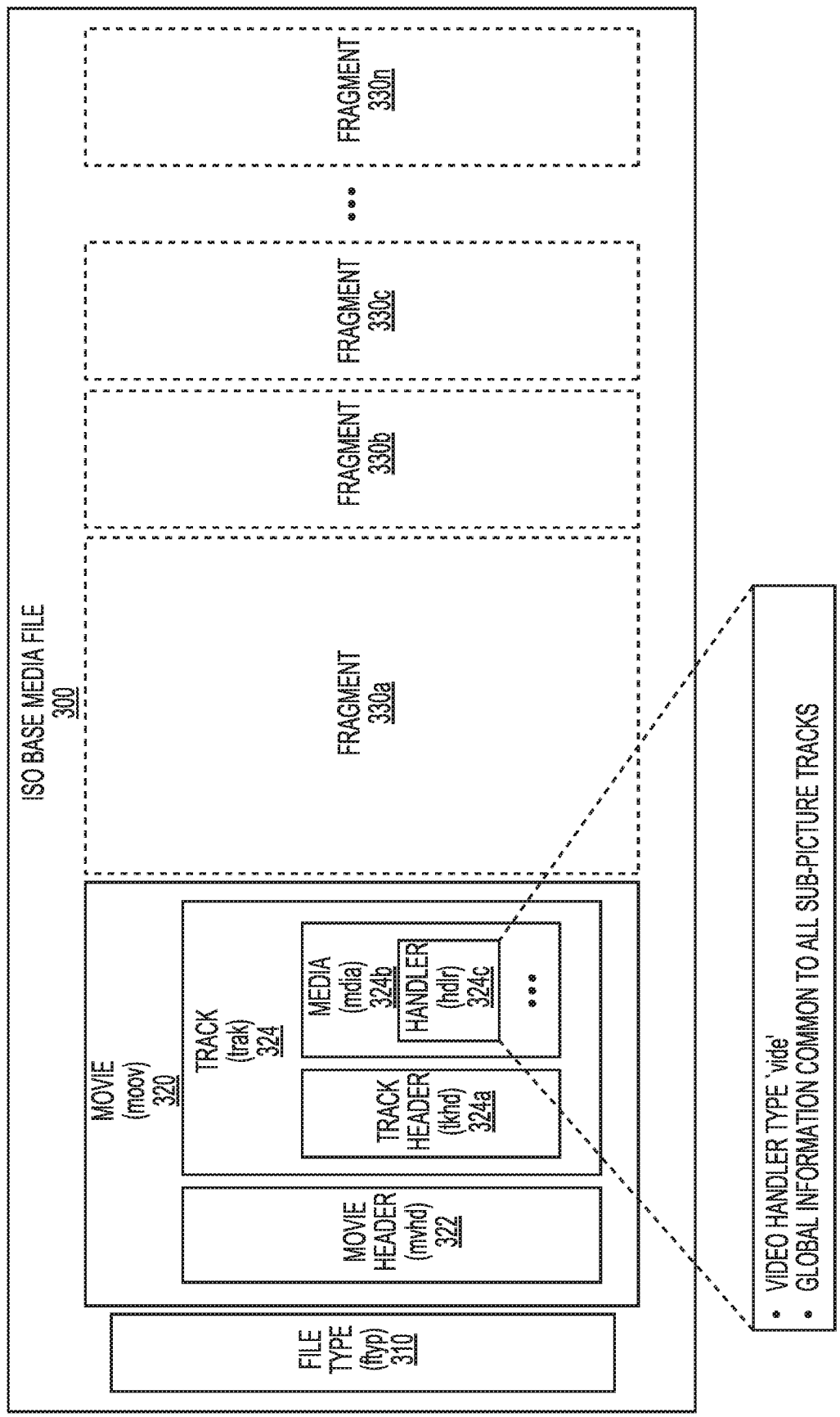
FIG. 3 illustrates an ISO Base Media File 300 to designate that a video media track is a sub-picture base track.

FIG. 3 illustrates an ISO Base Media File 300 to designate that a video media track is a sub-picture base track. The file type box 310 can be optionally used to indicate that the file 300 includes virtual reality content. The file type box 310 can also be used, for example, to specify a brand value that indicates that the file is compatible with a virtual reality brand. In various implementations, the compatible brands listed in the file type box 310 can also be used to provide optional brand indicators, which can be used to provide virtual-reality related parameters. For example, one compatible brand value can indicate that the virtual reality content is 2-dimensional (2-D) while another compatible brand value can indicate that the virtual reality content is 3-dimensional (3-D). As another example, compatible brand values can be used to indicate a mapping type; that is, whether the spherical representation of the virtual reality video has been mapped to an equirectangular, cube, or pyramid format, or some other format for storage in the file 300. In various implementations, information such as the dimensionality and/or mapping of the video can alternatively or additionally be indicated using optional fields in the file type box 310.

Movie box 320 can include a movie header box 322 and optionally one or more track boxes 324. The movie header box 322 may be optionally used to indicate that the movie or presentation described by the movie box 320 includes virtual reality content. The movie box 320 can include information that describes the presentation as a whole. The track box 324 can include the information for a track in the presentation. The track box 324 can include a track header box 324a and zero or more media data boxes 324b.

The file 300 can include a file type box 310, which can specify the brand(s) or particular iterations of the ISOBMFF or derivations of the ISOBMFF with which the file 300 is compatible. The file 300 can also include a movie box 320, which can contain the metadata for a presentation. The file 300 can optionally also include one or more fragments 330a, 330b, 330c, 330n, as discussed above.

The movie box 320 can include a movie header box 322 and one or more track boxes 324, as well as other boxes not illustrated here. The movie header box 322 can include information that describes the presentation as a whole. The track box 324 can include the information for a track in the presentation. The track box 324 can include a track header box 324a and zero or more media data boxes 324b.

The media data box 324b can include a handler box 342c, among other boxes. The handler box 342c, which may also be referred to as a handler reference box, can indicate the media type of the track. The media type of the track defines the process by which the media data in the track is presented. Examples of media types include video and audio, among others. The manner in which the media is presented can include a format for the media. For example, a format (e.g., aspect ratio, resolution, frame rate, etc.) that a player device uses to deliver video data in the track can be stored in the video track, and be identified by a video handler version of the handler box 342c. In some cases, the file 300 can include a general handler for metadata streams of any type. In these cases, the specific format of the video content can be identified by a sample entry that describes the content.

In some cases, the media data box 324b can include a handler box 342c. The handler box 324c may be used to signal that the contents of a track include a video handler type 'vide.' The handler type 'vide' can be used to document some global information of the video content that is common to all the sub-picture tracks. The sub-picture base track does not contain coded video data units. For example, in the context of NAL unit based video such as AVC and HEVC, the sub-picture base track does not contain any VCL NAL units.

In various implementations, the handler box 342c can be used to indicate that the media content referenced by the media data box 324b includes virtual reality content. For example, the handler box 342c can include an optional indicator (e.g., in a reserved bit or new variable) that the video content contained in the track is virtual reality video. Video players that are not configured to read the optional indicator may ignore it.

In some implementations, the video handler box can optionally also include parameters that describe the virtual reality content, such as whether the virtual reality video is 2-D or 3-D, whether the virtual reality video is pre-stitched or post-stitched, and/or a mapping for the virtual reality video. In various implementations, parameters related to the virtual reality content can be indicated in various other boxes that can be found in the track box 324. For example, the parameters can be signalled in the track header box 324a. Alternatively or additionally, the parameters can be signalled in a media header box (identified by box type "mdhd"), and/or in a video media header box (identified by box type "vmhd"), which are not illustrated here. Alternatively or additionally, parameters can be indicated in a sample entry, and/or in a newly defined box that can be placed at the top level of the track box 324.

Figure 4:
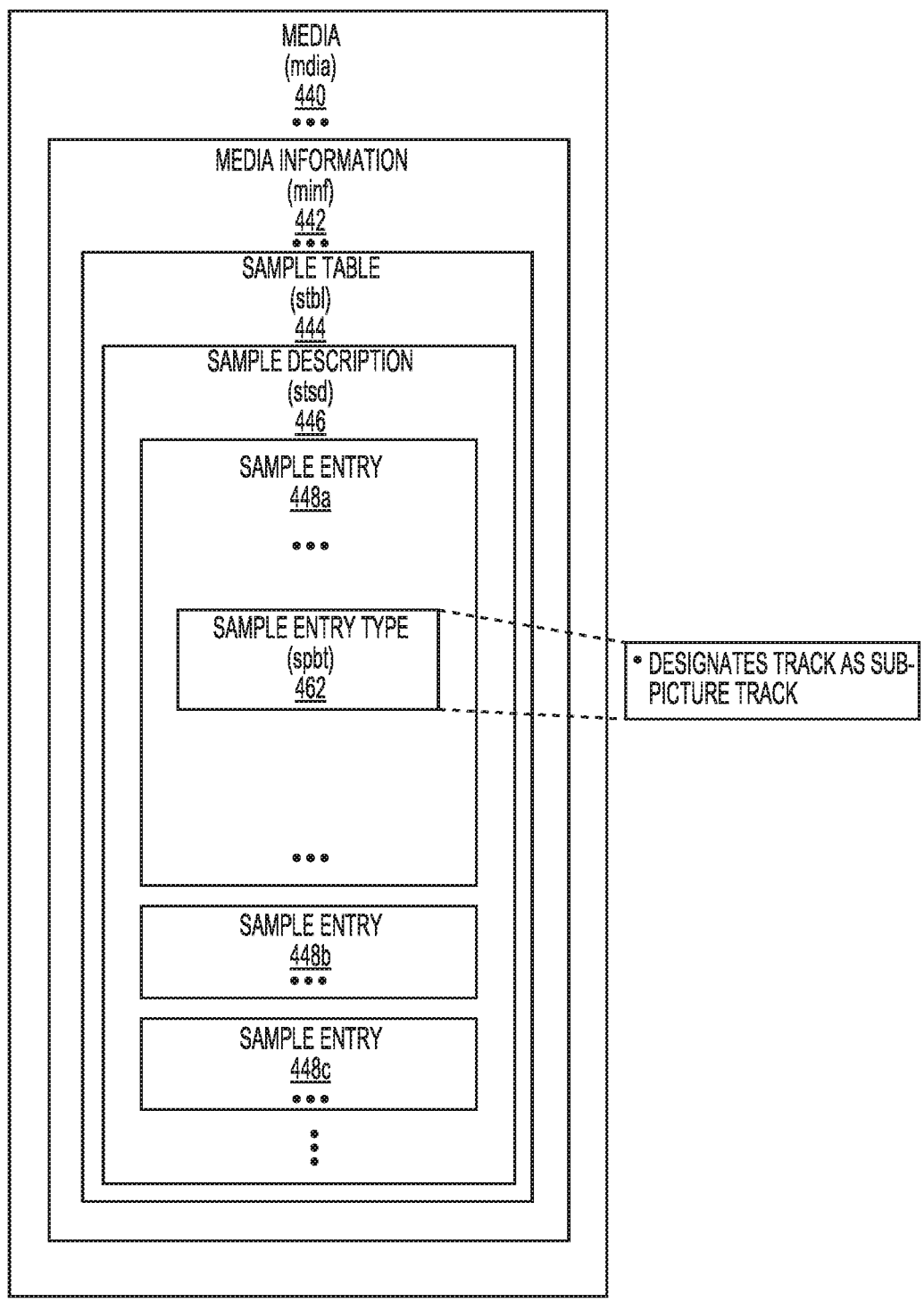
FIG. 4 illustrates an example of a media box 440 that can be included in an ISO base media file and may include a special sample entry type, e.g. 'spbt', is used for a sub-picture base track.

FIG. 4 illustrates an example of a media box 440 that can be included in an ISO base media file and may include a special sample entry type, e.g. 'spbt', is used for a sub-picture base track. As discussed above, a media box can be included in a track box, and can contain objects and information that describe media data in the track. In the illustrated example, the media box 440 includes a media information box 442. The media box 440 can also include other boxes, which are not illustrated here.

The media information box 442 can contain objects that describe characteristic information about the media in the track. For example, the media information box 442 can include a data information box, which describes the location of media information in the track. As another example, the media information box 442 can include a video media header, when the track includes video data. The video media header can contain general presentation information that is independent of the coding of the video media. The media information box 442 can also include a sound media header when the track includes audio data.

The media information box 442 can also include a sample table box 444, as provided in the illustrated example. The sample table box 444, identified by the box type "stbl," can provide locations (e.g., locations with a file) for the media samples in the track, as well as time information for the samples. Using the information provided by the sample table box 444, a player device can locate samples in correct time order, determine the type of a sample, and/or determine the size, container, and offset of a sample within a container, among other things.

The sample table box 444 can include a sample description box 446, identified by the box type "stsd." The sample description box 446 can provide detailed information about, for example, the coding type used for a sample, and any initialization information needed for that coding type. The information stored in the sample description box can be specific to a type of the track that includes the samples. For example, one format may be used for the sample description when the track is a video track and a different format may be used when the track is a hint track. As a further example, the format for the sample description may also vary depending on the format of the hint track.

The sample description box 446 can include one or more sample entry boxes 448a, 448b, 448c. The sample entry type is an abstract class, and thus typically the sample description box includes a specific sample entry box, such as a visual sample entry for video data or an audio sample entry for audio samples, among other examples. A sample entry box can store the parameters for a particular sample. For example, for a video sample, the sample entry box can include a width, height, horizontal resolution, vertical resolution, frame count, and/or depth for the video sample, among other things. As another example, for an audio sample, the sample entry can include a channel count, a channel layout, and/or a sampling rate, among other things.

Figure 5:
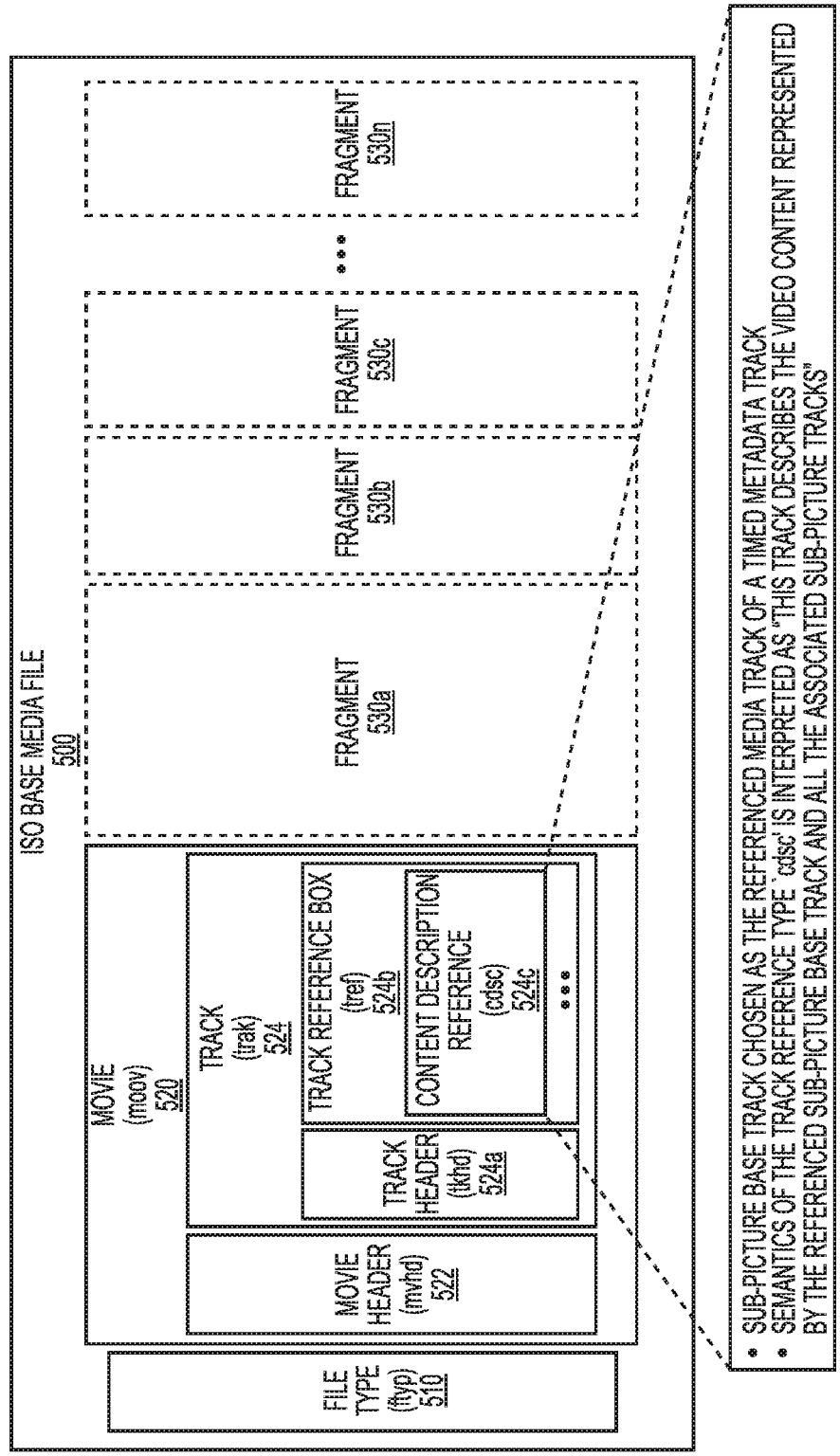
FIG. 5 illustrates an example of an ISO base media file 500 indicating that sub-picture base track can be chosen as the referenced media track of a timed metadata track.

FIG. 5 illustrates an example of an ISO base media file 500 indicating that sub-picture base track can be chosen as the referenced media track of a timed metadata track. The semantics of the track reference type 'cdsc' is interpreted as "this track describes the video content represented by the referenced sub-picture base track and all the associated sub-picture tracks". The file 500 can include a file type box 510, which can specify the brand(s) or particular iterations of the ISOBMFF or derivations of the ISOBMFF with which the file 500 is compatible. The file 500 can also include a movie box 520, which can contain the metadata for a presentation. The file 500 can optionally also include one or more fragments 530a, 530b, 530c, 530n, as discussed above.

The movie box 520 can include a movie header box 522 and one or more track boxes 524, as well as other boxes not illustrated here. The movie header box 522 can include information that describes the presentation as a whole. The track box 524 can include the information for a track in the presentation. The track box 524 can include a track header box 524a and zero or more media data boxes 524b.

As discussed above, in some cases the track reference box 524b can include content description reference 'cdsc' 524c, which is interpreted as "this track describes the video content represented by the referenced sub-picture base track and all the associated sub-picture tracks." This addresses a problem in storage and signalling of a video content including multiple sub-picture bitstreams stored in multiple sub-picture tracks. A timed metadata track may be used to signal timed information of a media track and is associated with the media track through the track reference of type 'cdsc'. This media track is also referred to as the referenced (media) track of the timed metadata track. However, a media content can be represented in multiple media tracks, e.g., a video content carried in a tile base track and a number of tile tracks, or a video content carried in a number of sub-picture tracks. In the HEVC tile based case (of a tile base track and a number of tile tracks), it is straightforward to choose the tile base track as the referenced media track for the timed metadata track, and the semantics of the track reference type 'cdsc' is interpreted as "this track describes the video content represented by the referenced tile base track and all the associated tile tracks". However, in the case of a number of separately coded and independent sub-picture tracks, choosing any of sub-picture tracks as the referenced track is not desirable as that means that the timed metadata track contains information only on the sub-picture part of the video content.

Figure 6:
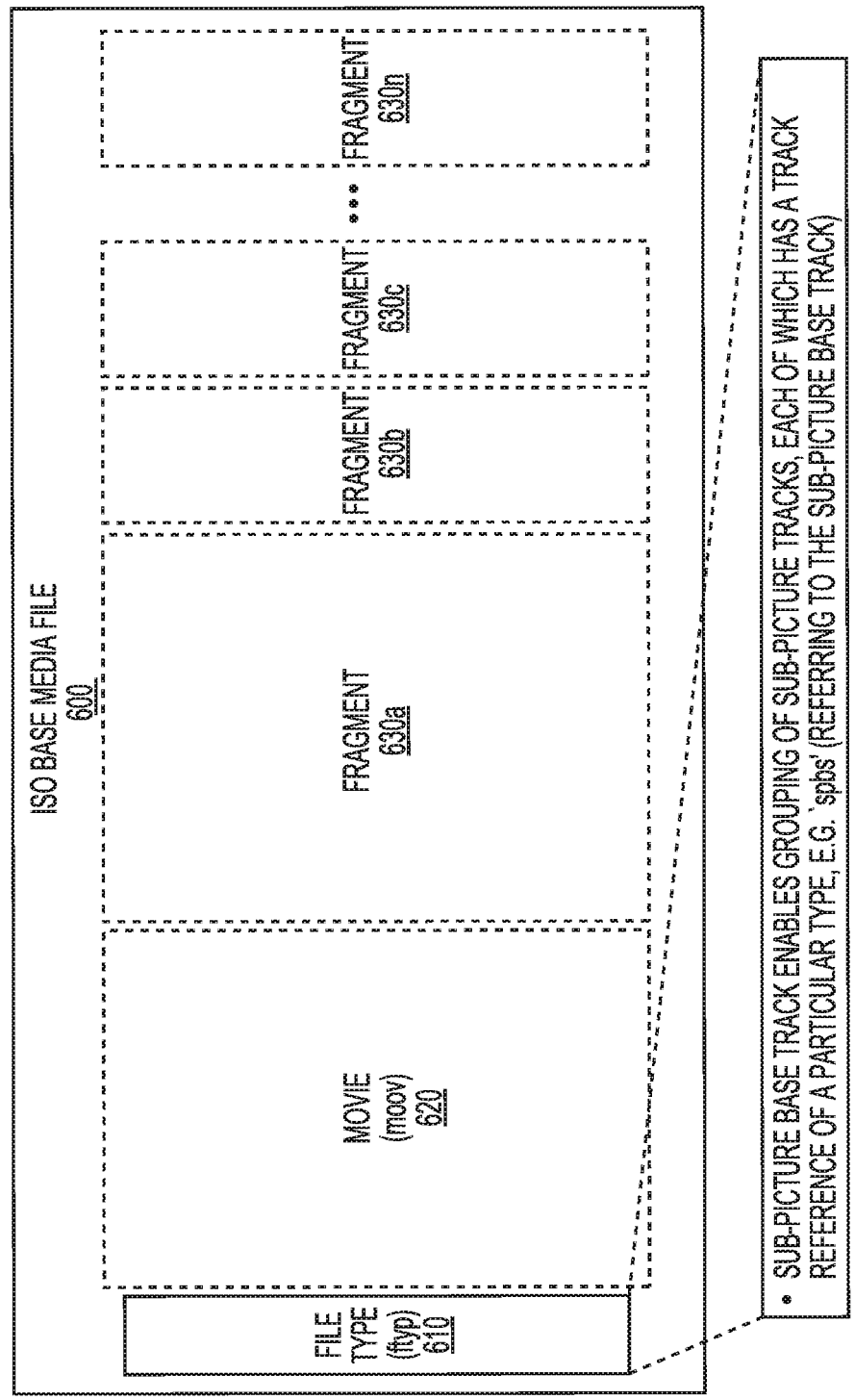
FIG. 6 illustrates an example where an ISO base media file 600 used with a sub-picture base track mechanism enables grouping of all the sub-picture tracks, each having a track reference of a particular type, e.g. 'spbs', referring to the sub-picture base track.

FIG. 6 illustrates an example where an ISO base media file 600 used with a sub-picture base track mechanism enables grouping of all the sub-picture tracks, each having a track reference of a particular type, e.g. 'spbs', referring to the sub-picture base track. The file 600 can include a file type box 610, which can specify the brand(s) or particular iterations of the ISOBMFF or derivations of the ISOBMFF with which the file 600 is compatible. The file 600 can also include a movie box 620, which can contain the metadata for a presentation. The file 600 can optionally also include one or more fragments 630a, 630b, 630c, 630n, as discussed above.

In the example of FIG. 6, the file type box 610 can be used in a sub-picture based approach, wherein a video content is encoded and stored in a file based on the ISOBMFF as follows. The source video is split into sub-picture sequences before encoding. Each sub-picture sequence covers a subset of the spatial area of the full video content. Each sub-picture sequence is then encoded independently from each other as a single bitstream. Such a bitstream is referred to as a sub-picture bitstream. Several bitstreams may be encoded from the same sub-picture sequence, e.g. for different bitrates. Each sub-picture bitstream is encapsulated in a file as its own track. Such a track is referred to as a sub-picture track. Similar to the HEVC tile based viewport dependent video coding schemes such a sub-picture based approach can be also utilized for optimizations of decoding complexity and transmission bandwidth in VR applications.

Figure 7:
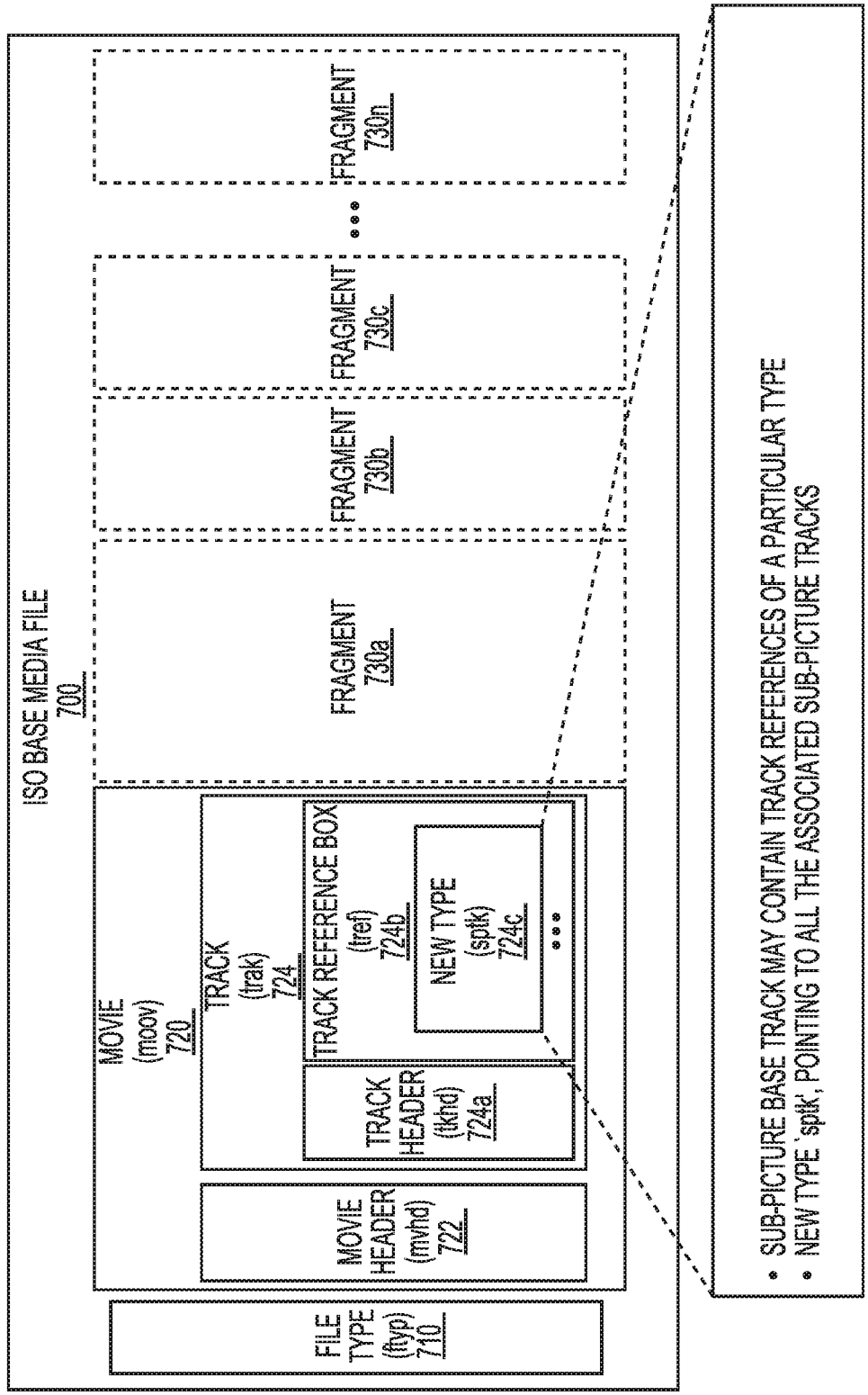
FIG. 7 illustrates an example of an ISO base media file 700 wherein the sub-picture base track may contain track references of a particular type, e.g., 'strk', pointing to all the associated sub-picture tracks.

FIG. 7 illustrates an example of an ISO base media file 700 wherein the sub-picture base track may contain track references of a new particular type, e.g., 'sptk', pointing to all the associated sub-picture tracks. This track reference may indicate the relationship between the sub-picture tracks. The file 700 can include a file type box 710, which can specify the brand(s) or particular iterations of the ISOBMFF or derivations of the ISOBMFF with which the file 700 is compatible. The file 700 can also include a movie box 720, which can contain the metadata for a presentation. The file 700 can optionally also include one or more fragments 730a, 730b, 730c, 730n, as discussed above.

The movie box 720 can include a movie header box 722 and one or more track boxes 724, as well as other boxes not illustrated here. The movie header box 722 can include information that describes the presentation as a whole. The track box 724 can include the information for a track in the presentation. The track box 724 can include a track header box 724a and zero or more user data boxes 724b.

As discussed above, in some cases the track reference box 724b may contain a New Type box 724c that provides references of a particular type, e.g., 'sptk,' pointing to all the associated sub-picture tracks. In the OMAF CD sub-picture based approach, a video content is encoded and stored in a file based on the ISOBMFF as follows. The source video is split into sub-picture sequences before encoding. Each sub-picture sequence covers a subset of the spatial area of the full video content. Each sub-picture sequence is then encoded independently from each other as a single bitstream. Such a bitstream is referred to as a sub-picture bitstream. Several bitstreams may be encoded from the same sub-picture sequence, e.g. for different bitrates. Each sub-picture bitstream is encapsulated in a file as its own track. Such a track is referred to as a sub-picture track. Through the use of a sub-picture base track, references of a particular type, such as 'sptk' may be grouped for processing.

By way of the examples set forth above, each sub-picture track can still be independently parsed and decoded. Alternatively, the parameter sets are carried in the sub-picture base track, and each sub-picture track may utilize the presence of a sub-picture base track for media decoding. This requires that when encoding the bitstreams of the sub-picture tracks, parameter sets of a particular type with different contents shall use different parameter set IDs.

Another solution for the problems identified above, is to use the track group design in clause 8.3.4 of the ISOBMFF, through a backward compatible extension to the TrackGroupTypeBox as described in further below.

Figure 8:
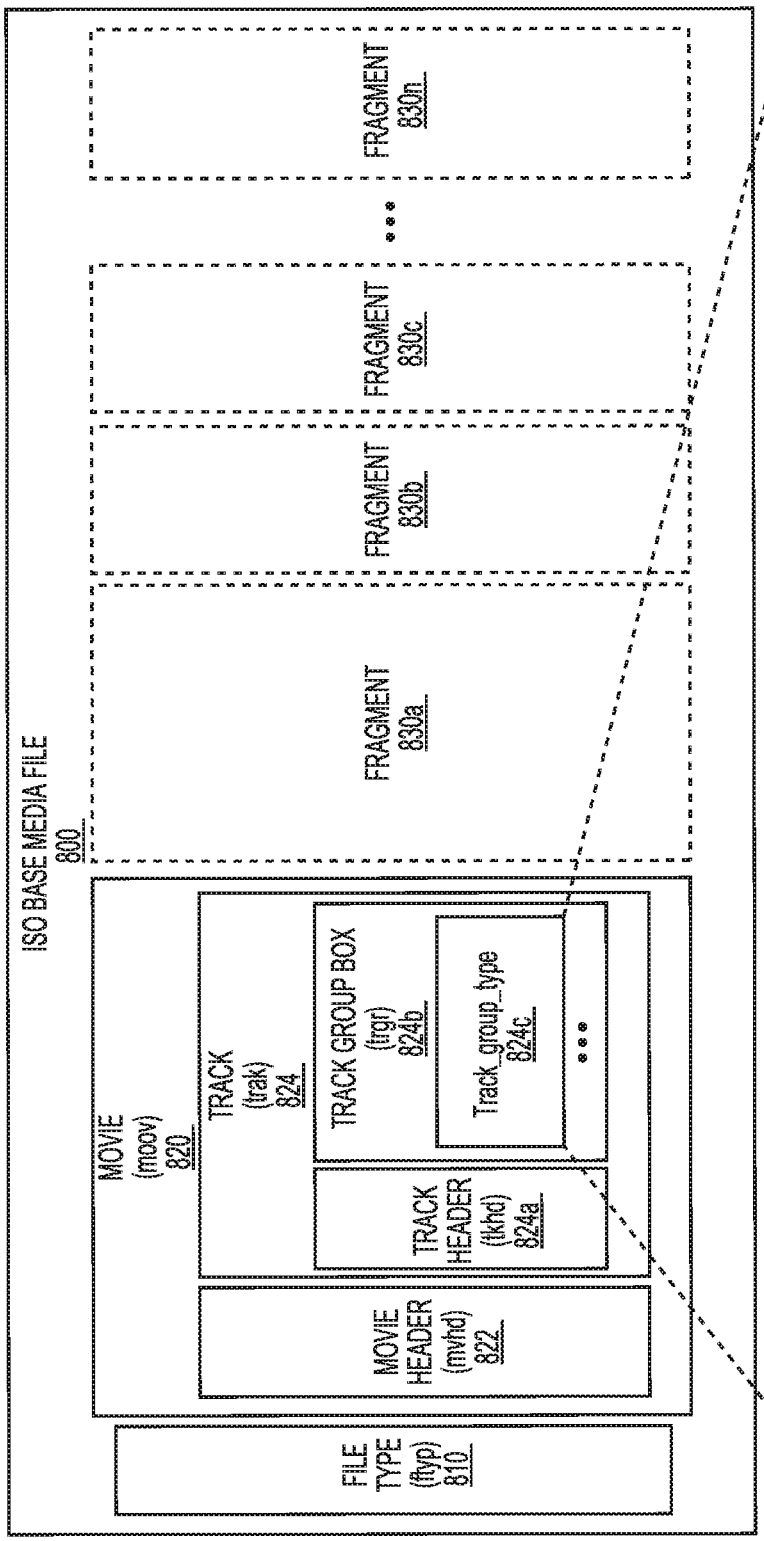
FIG. 8 illustrates an example of an ISO base media file 800 that defines new track grouping type, e.g., identified by track_group_type equal to 'subp.'

FIG. 8 illustrates an example of an ISO base media file 800 that defines new track grouping type, e.g., identified by track_group_type equal to 'subp.' This track group type indicates that the current track is one a group of sub-picture tracks carrying one representation of a full video content. The file 800 can include a file type box 810, which can specify the brand(s) or particular iterations of the ISOBMFF or derivations of the ISOBMFF with which the file 800 is compatible. The file 800 can also include a movie box 820, which can contain the metadata for a presentation. The file 800 can optionally also include one or more fragments 830a, 830b, 830c, 830n, as discussed above.

The movie box 820 can include a movie header box 822 and one or more track boxes 824, as well as other boxes not illustrated here. The movie header box 822 can include information that describes the presentation as a whole. The track box 824 can include the information for a track in the presentation. The track box 824 can include a track header box 824a and zero or more track group boxes 824b.

The track group box 824b enables indication of groups of tracks, where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the Track Group Box, and have the same identifier value within these contained boxes belong to the same track group. Track groups shall not be used to indicate dependency relationships between tracks. Instead, the Track Reference Box is used for such purposes.

With regard to semantics, a track_group_type indicates the grouping type and shall be set to one of the following values, or a value registered, or a value from a derived specification or registration.

For example, a track_group_type of 'msrc' indicates that this track belongs to a multi-source presentation. The tracks that have the same value of track_group_id within a Group Type Box of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant. The pair of track_group_id and track_group_type identifies a track group within the file. The tracks that contain a particular track group type box having the same value of track_group_id belong to the same track group.

In this example, a new track grouping type, e.g., identified by track_group_type equal to 'subp' is defined. In the TrackGroupTypeBox, more information is available to be added when track_group_type is equal to the new track grouping type, e.g., 'subp'. One example of such information is the sub-picture row index and the sub-picture column index of the sub-pictures in the current track. This requires that the sub-pictures must be in sub-picture rows and sub-picture columns. To enable more flexible sub-picture configurations, the coordinates (i.e., horizontal offset and vertical offset), on the full picture, of the pixel (i.e., luma sample) corresponding to the upper-left corner pixel of the sub-picture are signalled. This may be preferable than signalling of the sub-picture row index and the sub-picture column index. The coordinates may be in units of either pixels or in a relative unit. In the latter case, the width and height of the full picture as well as the width and height of the sub-picture, also in a relative unit, should be signalled.

In the TrackGroupTypeBox, more information is available to be added when track_group_type is equal to the new track grouping type, e.g., 'subp.' One example of such information is the size of the full picture. Other information, for example information described as global information above, may additionally or alternatively, may be provided when the track_group_type is equal to the new track grouping type. For an approach based upon encoding and decoding of sub-picture bitstreams for omnidirectional video streaming based on viewport dependent video coding, the source video is split into sub-picture sequences before encoding. Each sub-picture sequence covers a subset of the spatial area of the full video content. Each sub-picture sequence is then encoded independently from each other as a single bitstream. Such a bitstream is referred to as a sub-picture bitstream. Several bitstreams may be encoded from the same sub-picture sequence, e.g. for different bitrates. Each sub-picture bitstream is then encapsulated in a file as its own track, referred to as a sub-picture track. Because each sub-picture is encoded independently, there is currently no mechanism to determine the size of the full picture. As set forth above, VR content rendering devices, such as an HMD, which can track head movement and/or eye move moment, and render the corresponding part of the video to deliver an immersive experience to the user, have inherent processing and storage constraints. In order to deliver a high quality immersive user experience, the VR content rendering device may utilize size information of the full picture as criteria for selecting sub-picture sequence with a suitable bitrate and quality. By way of signalling the full picture size in the TrackGroupTypeBox, this information is repeated in all the sub-picture tracks.

Through a backward compatible extension to the TrackGroupTypeBox, all the sub-picture tracks carrying one representation of a full video content would be associated with the same value of track_group_id and the new track grouping type. Any of the sub-picture tracks can then be chosen as the referenced media track of a timed metadata track, and the semantics of the track reference type 'cdsc' is interpreted as "this track describes the video content represented by the referenced sub-picture track and all other associated sub-picture tracks belonging to the same track group".

Figure 9:
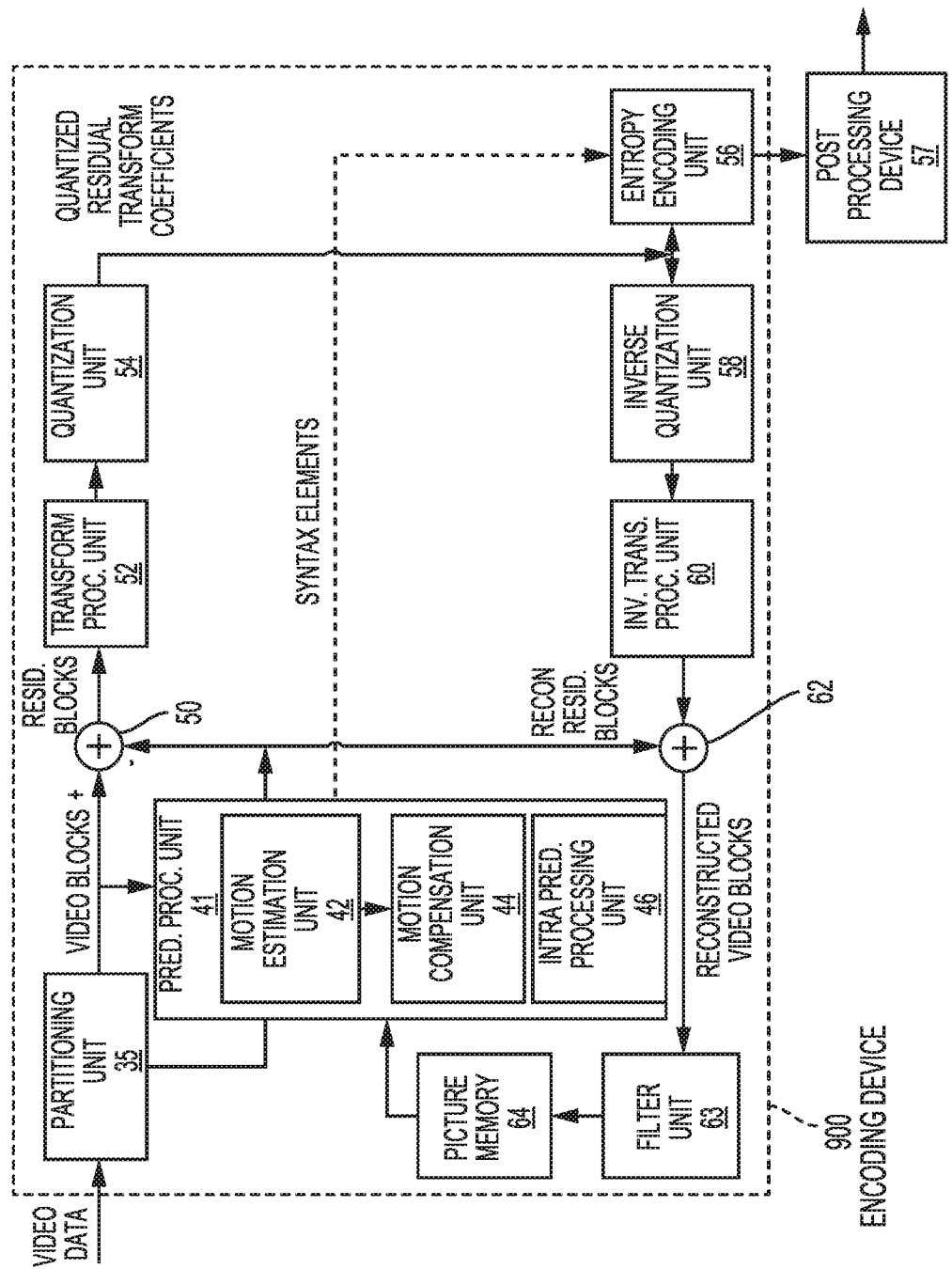
FIG. 9 is a block diagram illustrating an example encoding device 900 that may implement one or more of the techniques described in this disclosure.
Figure 10:
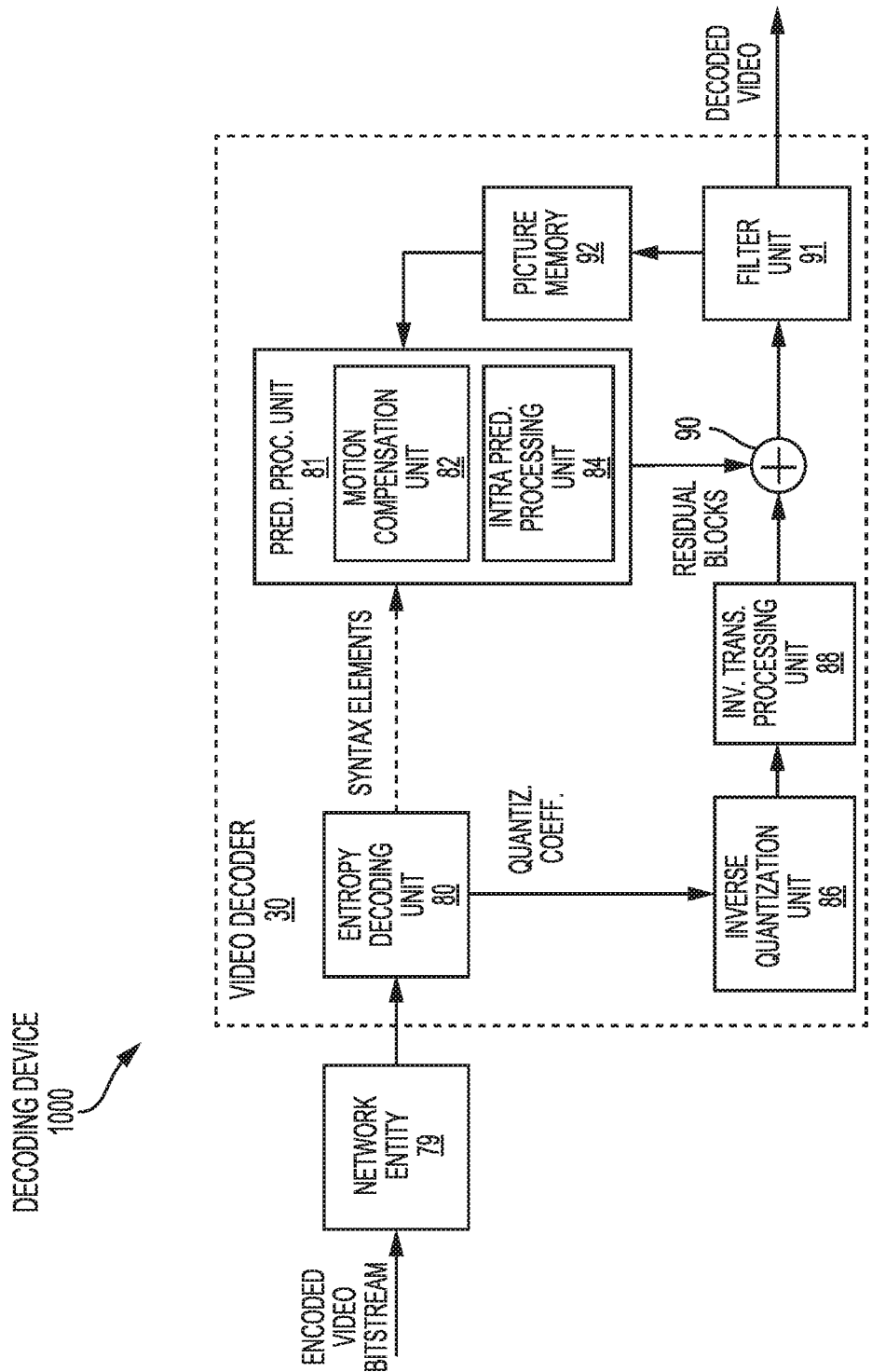
FIG. 10 is a block diagram illustrating an example decoding device 1000.

FIG. 9 and FIG. 10 show specific details of encoding device 900 and decoding device 1000, respectively. FIG. 9 is a block diagram illustrating an example encoding device 900 that may implement one or more of the techniques described in this disclosure. Encoding device 900 may, for example, generate the syntax structures described herein (e.g., the syntax structures of a VPS, SPS, PPS, or other syntax elements). Encoding device 900 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 900 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 900 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by encoding device 900. The techniques of this disclosure may in some instances be implemented by encoding device 900. In other instances, however, one or more of the techniques of this disclosure may be implemented by post processing device 57.

As shown in FIG. 9, encoding device 900 receives video data, and partitioning unit 35 partitions the data into video blocks. The partitioning may also include partitioning into slices, slice segments, tiles, or other larger units, as well as video block partitioning, e.g., according to a quadtree structure of LCUs and CUs. Encoding device 900 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 900 may calculate values for sub-integer pixel positions of reference pictures stored in picture memory 64. For example, encoding device 900 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 900 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 1000 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 900 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 900 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 1000, or archived for later transmission or retrieval by decoding device 1000. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 900 of FIG. 9 represents an example of a video encoder configured to generate syntax for an encoded video bitstream. Encoding device 900 may, for example, generate VPS, SPS, and PPS parameter sets as described above. The encoding device 900 may perform any of the techniques described herein, including the processes described above with respect to FIG. 9 and FIG. 10. The techniques of this disclosure have generally been described with respect to encoding device 900, but as mentioned above, some of the techniques of this disclosure may also be implemented by post processing device 57.

FIG. 10 is a block diagram illustrating an example decoding device 1000. The decoding device 1000 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 1000 may, in some examples, perform a decoding pass generally reciprocal to the encoding pass described with respect to encoding device 900 from FIG. 9.

During the decoding process, decoding device 1000 receives an encoded video bitstream that represents video blocks of an encoded video slice and associated syntax elements sent by encoding device 900. In some examples, the decoding device 1000 may receive the encoded video bitstream from the encoding device 900. In some examples, the decoding device 1000 may receive the encoded video bitstream from a network entity 79, such as a server, a media-aware network element (MANE), a video editor/splicer, or other such device configured to implement one or more of the techniques described above. Network entity 79 may or may not include encoding device 900. Some of the techniques described in this disclosure may be implemented by network entity 79 prior to network entity 79 transmitting the encoded video bitstream to decoding device 1000. In some video decoding systems, network entity 79 and decoding device 1000 may be parts of separate devices, while in other instances, the functionality described with respect to network entity 79 may be performed by the same device that comprises decoding device 1000.

The entropy decoding unit 80 of decoding device 1000 entropy decodes the bitstream to generate quantized coefficients, motion vectors, and other syntax elements. Entropy decoding unit 80 forwards the motion vectors and other syntax elements to prediction processing unit 81. Decoding device 1000 may receive the syntax elements at the video slice level and/or the video block level. Entropy decoding unit 80 may process and parse both fixed-length syntax elements and variable-length syntax elements in one or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signalled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 1000 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 900 during encoding of the video blocks to calculate interpolated values for sub-integer pixels of reference blocks. In this case, motion compensation unit 82 may determine the interpolation filters used by encoding device 900 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 900 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 1000 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific examples thereof, but those skilled in the art will recognize that the disclosure is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described disclosure may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASIC s), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some examples, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to a destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from a source device to a destination device. In one example, a computer-readable medium may comprise a communication medium to enable a source device to transmit encoded video data directly to a destination device in real-time. The encoded video data may be modulated according to a communication standard, such as a wireless communication protocol, and transmitted to a destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example, the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source devices and destination devices are merely examples of such coding devices in which a source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if a video source is a video camera, a source device and a destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various examples and embodiments of the disclosure have been described.

What is claimed is:

1. A method of processing omnidirectional video data, comprising:
obtaining, from memory, a plurality of sub-picture bitstreams associated with an omnidirectional scene, each sub-picture bitstream including video data specifying a respective subset of spatial area of an entire spatial area of the omnidirectional scene, where each respective subset of spatial area is less than the entire spatial area of the omnidirectional scene and each sub-picture bitstream is independently coded;
respectively storing, in at least one file, the plurality of sub-picture bitstreams associated with the omnidirectional scene as a plurality of sub-picture tracks associated with the omnidirectional scene; and
setting, in a track box within a media file in accordance with a file format, a track group type of a sub-picture track among the plurality of sub-picture tracks to a value that indicates that the sub-picture track belongs to a group of sub-picture tracks that carries the omnidirectional scene, the group of sub-picture tracks being the plurality of sub-picture tracks.

2. The method of claim 1, wherein the media file includes the at least one file.

3. The method of claim 1, further comprising:
storing a sub-picture base track associated with the plurality of sub-picture tracks.

4. The method of claim 3, further comprising:
indicating the sub-picture base track based on a sample entry type within a sample description box of the track box.

5. The method of claim 3, wherein the sub-picture base track includes metadata describing the plurality of sub-picture tracks.

6. The method of claim 1, further comprising including metadata that comprises a spatial resolution of a full picture associated with a set of the plurality of sub-picture tracks.

7. The method of claim 1, wherein the file format is based on an International Standards Organization (ISO) base media file format.

8. The method of claim 1, wherein the track group type is a backward compatible extension to the TrackGroupTypeBox set forth in clause 8.3.4 of the ISO base media file format identified by ISO/IEC 14496-12, Part 12.

9. The method of claim 1, further comprising:
storing, within the track box, a track group type box designating the track group type.

10. The method of claim 9, wherein the track group type indicates that additional information is available to be added to the track box.

11. The method of claim 10, wherein when the track group type indicates that additional information is available to be added to the track box, storing, within the track box, sub-picture row index information and sub-picture column index information of sub-pictures in the track.

12. The method of claim 10, wherein sub-pictures encoded within the sub-picture bitstream are defined in sub-picture rows and sub-picture columns.

13. The method of claim 10, wherein sub-pictures encoded within the sub-picture bitstream are groupable as tiles such that the tiles are defined tile rows and tile columns.

14. The method of claim 10, wherein when the track group type indicates that additional information is available to be added to the track box, storing, within the track box, coordinates corresponding to an upper-left corner pixel of sub-picture in the track.

15. The method of claim 10, wherein when the track group type indicates that additional information is available to be added to the track box, storing, within the track box, information representing a size of a full picture.

16. A device for decoding omnidirectional video data, the device comprising:
memory configured to store at least one file and a media file, the media file being formatted in accordance with a file format and the at least one file including a plurality of sub-picture tracks associated with an omnidirectional scene, each sub-picture track comprising a respective sub-picture bitstream that includes video data specifying a respective subset of spatial area of an entire spatial area of the omnidirectional scene where each respective subset of spatial area is less than the entire spatial area of the omnidirectional scene and each sub-picture bitstream is independently coded; and
a processor, in communication with the memory, the processing being configured to:
process the media file; and
determine, from a track box within the media file and for a sub-picture track among the plurality of sub-picture tracks associated with the omnidirectional scene, that the sub-picture track belongs to a group of sub-picture tracks that carries the omnidirectional scene based on a value of a track group type of the sub-picture track, the group of sub-picture tracks being the plurality of sub-picture tracks included within the at least one file.

17. The device of claim 16, wherein the media file includes the at least one file.

18. The device of claim 16, wherein the processor is further configured to obtain, from the media file, a sub-picture base track associated with the plurality of sub-picture tracks.

19. The device of claim 18, wherein the processor is further configured to determine, based on a sample entry type within a sample description box of the track box, a presence of the sub-picture base track.

20. The device of claim 18, wherein the processor is further configured to obtain, from the sub-picture base track, metadata describing the plurality of sub-picture tracks.

21. The device of claim 16, wherein the processor is further configured to process metadata comprising a spatial resolution of a full picture associated with a set of the plurality of sub-picture tracks.

22. The device of claim 16, wherein the file format is based on an International Standards Organization (ISO) base media file format.

23. The device of claim 16, wherein the processor is further configured to obtain, from a track group type box of the track box, sub-picture row index information and sub-picture column index information of sub-pictures in the track.

24. A device for processing omnidirectional video data, the device comprising:
memory configured to store a plurality of sub-picture bitstreams associated with an omnidirectional scene, each sub-picture bitstream including video data specifying a respective subset of spatial area of an entire spatial area of the omnidirectional scene, where each respective subset of spatial area is less than the entire spatial area of the omnidirectional scene and each sub-picture bitstream is independently coded; and a processor in communication with the memory the processor being configured to:
  obtain, from the memory, the plurality of sub-picture bitstreams associated with the omnidirectional scene;
  respectively store, in at least one file, the plurality of sub-picture bitstreams as a plurality of sub-picture tracks associated with the omnidirectional scene; and
  set, in a track box within a media file in accordance with a file format, a track group type of a sub-picture track among the plurality of sub-picture tracks to a value that indicates that the sub-picture track belongs to a group of sub-picture tracks that carries the omnidirectional scene, the group of sub-picture tracks being the plurality of sub-picture tracks.

25. The device of claim 24, wherein the media file includes the at least one file.

26. The device of claim 24, wherein the processor is further configured to store a sub-picture base track associated with the plurality of sub-picture tracks.

27. The device of claim 26, wherein the processor is further configured to set a value of a sample entry type within a sample description box of the track box, the value indicating a presence of the sub-picture base track.

28. The device of claim 26, wherein the sub-picture base track includes metadata describing the plurality of sub-picture tracks.

29. The device of claim 24, wherein the processor is further configured to include metadata that comprises a spatial resolution of a full picture associated with a set of the plurality of sub-picture tracks.

30. The device of claim 24, wherein the file format is based on an International Standards Organization (ISO) base media file format.

31. The device of claim 26, wherein the processor is further configured to store, within a track group type box of the track box, sub-picture row index information and sub-picture column index information of sub-pictures in the track.

32. The device of claim 24, wherein the device is a wireless communication device, further comprising:
  a transmitter configured to transmit the plurality of sub-picture bitstreams.

33. The device of claim 32, wherein the wireless communication device is a cellular telephone and the plurality of sub-picture bitstreams are further modulated for transmission according to a cellular communication standard.

34. A device comprising:
  means for obtaining, from memory, a plurality of sub-picture bitstreams associated with an omnidirectional scene, each sub-picture bitstream including video data specifying a respective subset of spatial area of an entire spatial area of the omnidirectional scene, where each respective subset of spatial area is less than the entire spatial area of the omnidirectional scene and each sub-picture bitstream is independently coded;
  means for respectively storing, in at least one file, the plurality of sub-picture bitstreams associated with the omnidirectional scene as a plurality of sub-picture tracks associated with the omnidirectional scene; and
  means for setting, in a track box within a media file in accordance with a file format, a track group type of a sub-picture track among the plurality of sub-picture tracks to a value that indicates that the sub-picture track belongs to a group of sub-picture tracks that carries the omnidirectional scene, the group of sub-picture tracks being the plurality of sub-picture tracks.

35. A non-transitory computer-readable medium having instructions stored thereon that, when executed, cause one or more processors of an electronic device to:
  obtain, from memory, a plurality of sub-picture bitstreams associated with an omnidirectional scene, each sub-picture bitstream including video data specifying a respective subset of spatial area of an entire spatial area of the omnidirectional scene, where each respective subset of spatial area is less than the entire spatial area of the omnidirectional scene and each sub-picture bitstream is independently coded;
  respectively store, in at least one file, the plurality of sub-picture bitstreams associated with the omnidirectional scene as a plurality of sub-picture tracks associated with the omnidirectional scene; and
  set, in a track box within a media file in accordance with a file format, a track group type of a sub-picture track among the plurality of sub-picture tracks to a value that indicates that the sub-picture track belongs to a group of sub-picture tracks that carries the omnidirectional scene, the group of sub-picture tracks being the plurality of sub-picture tracks.

* * * * *